Patented Nov. 4, 1924.

1,514,554

UNITED STATES PATENT OFFICE.

CHOKICHI MATSUOKA, OF LOS ANGELES, CALIFORNIA.

JAPANESE SOY AND METHOD OF MAKING THE SAME.

No Drawing.    Application filed December 3, 1923.  Serial No. 678,353.

*To all whom it may concern:*

Be it known that I, CHOKICHI MATSUOKA, a subject of the Emperor of Japan, residing at Los Angeles, in the county of Los Angeles and State of California, have invented and discovered a new and useful Improvement in Japanese Soy and Methods of Making the Same, of which the following is a specification.

By the methods heretofore known, the production of a specimen of Japanese soy has required a period of from one to three years depending on the rapidity with which the proper fermentation is completed.

An object of this invention and discovery is to enable the manufacturer to produce Japanese soy more rapidly than has heretofore been deemed possible.

I have discovered that it is possible by removing starch and albumen in a nutritive liquid extract from soy stock, that is to say from the main ingredient heretofore used in manufacturing Japanese soy and treating the same separately of the solids contained in soy stock, I am able to produce in about three or four weeks, a product which is practically identical with the Japanese soy heretofore made by the old process or method; and that the soy thus produced is adaptable by further treatment to be reduced to a cake or powdered form in which the soy may be advantageously stored and marketed.

This invention and discovery is broadly new, basic and pioneer in that prior to fermentation I produce from the main materials or stock from which Japanese soy has heretofore been made, a liquid extract containing albumen and free from solids, and then treat the same to produce the desired product.

An object of this discovery is to produce a concentrated Japanese soy product from which liquid Japanese soy may be made as desired for use.

The stock material or main ingredient from which Japanese soy is usually made is a legume or a cereal such as soja beans or wheat or a mixture of both.

I will now describe the method of producing Japanese soy in accordance with my discovery and invention.

The ingredients or stock material used in the manufacture of this Japanese soy are as follows:

Water; soja bean (*Hispida* or *Glycine Soja*) and wheat; or either the soja bean or wheat; cooking salt; and aspergillus.

The soy stock may be prepared by boiling either the soja bean or the wheat or a mixture of both wheat and soja bean in water in the proportions of 3 or 4 pounds of water to 1 pound of bean or wheat.

In preparing the stock of soja bean, the beans are first boiled for from 8 to 16 hours in the water thus producing the stock, consisting of liquid and solids. Then the liquid is separated from the solids by any usual means as by straining or filtering, thus obtaining a nutritive liquid extract containing the greater portion of the starch and albumen content of the bean.

To prepare the stock from wheat, the wheat is boiled in water in the proportions practically the same as those above, for from 10 to 15 hours, thus producing the soy stock, composed of the liquid and solids of the wheat. Then the liquid is separated from the solids in the manner above stated, thus obtaining a nutritive extract containing the greater portion of starch and albumen content of the wheat.

If it is desired, the soja beans and the wheat may be mixed in any proportions desired and boiled together for from 10 to 16 hours, thus producing the soy stock, containing liquid and the solids and the soja bean. The liquid is then separated substantially as above indicated, to obtain a liquid extract containing the starch and albumen component with beans and wheat; or the wheat and soja beans may be boiled separately as first above set forth and the stock thus produced be mixed, or the extract therefrom may be used separately in any desired proportions.

After obtaining the liquid extract by any of the methods above set forth, I then add to such extract ordinary table salt, i. e. chloride of sodium, in the proportions of about 30 to 40 pounds of salt to 10 gallons of liquid and the salt is thoroughly stirred into the liquid and then aspergillus in the proportion of 1 to 3 pounds of aspergillus to 1 gallon of liquid is added to the salt and liquid extract and is thoroughly mixed therewith by stirring.

The mixture is then placed in tanks and is there fermented; and for production on a large scale may be placed in large tanks of suitable size to accommodate large charges of the mixture.

The fermentation of the liquid mixture is produced by heating the same to temperatures of various degrees for varying periods; and this may be accomplished by placing a steam coil in the tank or by placing the tank in a room which is heated to the required temperature.

To produce and maintain fermentation the temperature of the mixture is increased from approximately 90° F. to approximately 140° F. in the following manner: The mixture will be maintained at approximately 90° F. for about 10 or 15 hours, then the temperature will be raised to approximately 120° F. for about 10 or 15 hours, and then to approximately 140° F. for about 10 or 15 hours. The process of fermentation is then repeated in the above manner until fermentation ceases, which will be about 2 to 4 weeks according to the extent to which solids of soja beans or wheat have not been removed from the liquid.

During fermentation the mixture is stirred 2 or 3 times a day to cause fermentation to be even throughout. Such stirring may be by any well-known means such as a paddle or by compressed air introduced into the mixture by a pipe and allowed to bubble through the mixture.

After fermentation ceases, the mixture is strained or passed through a filter to remove any lumps and foreign substances and this product is soy.

The soy is then heated for about 45 to 60 minutes, to a temperature of about 212° F. to kill any germs that may be in the product as a result of fermentation.

If it is desired to make a soy having a thick consistency, the nutritive liquid albumen extract obtained from the soja beans and wheat is evaporated to the degree desired before the salt and aspergillus are added.

The soy thus produced can be reduced to a solid cake or powdered form by evaporating the liquid soy obtained as above, until there is produced a hardened mass which may be cut into cubes and marketed in that form or may be powdered and marketed. By adding water to such solid or powdered soy, a soy having all the characteristics of the well known liquid Japanese soy is produced.

If desired, the wheat or soja bean may be roasted before boiling, to produce a soy having a dark caramel color.

The main features of this invention are the separation of the albumen and starch properties of the wheat and soja bean from the solids in a nutritive liquid extract and the process of fermenting the mixture, both of which enable me to produce Japanese soy in a comparatively short time.

The dry product herein set forth consists of non-fermentable albumen and starch content of soy stock.

I claim:

1. The method set forth of making Japanese soy, comprising first obtaining from the main ingredients commonly used in manufacturing Japanese soy, a nutritive liquid extract containing the greater portion of albumen and starch content of such ingredients separated from the solids of the ingredients; then adding table salt and aspergillus to the liquid; and then fermenting the mixture until fermentation ceases.

2. The method set forth of making Japanese soy, comprising first obtaining from soy stock a nutritive liquid extract containing the greater portion of the starch and albumen content of such stock; then adding salt and aspergillus to such extract; and then fermenting the mixture until fermentation ceases.

3. The method set forth of making Japanese soy comprising first obtaining from soy stock a nutritive liquid extract containing the greater portion of the starch and albumen content of such stock; then adding salt and aspergillus to such extract; then fermenting the mixture until fermentation ceases; then straining the product; and then boiling the resulting product.

4. The method set forth of making Japanese soy comprising first boiling soy stock material in water to obtain a nutritive liquid stock containing the greater portion of the albumen and starch content of such material; extracting the liquid from the solids thus producing a liquid soy extract; adding salt and aspergillus to the extract; then fermenting the mixture until fermentation ceases; then boiling the product to kill any germs introduced during fermentation; and then evaporating liquid from the product to produce a hardened mass.

5. The method set forth of making Japanese soy, comprising first boiling soy stock materials in water for about 8 to 16 hours, thus producing soy stock; then extracting the liquid from the solids of such stock; then adding table salt to such liquid extract in the proportions of about 30 to 40 pounds of salt to 10 gallons of liquid extract; then adding aspergillus to such extract in the proportions of about 1 to 3 pounds aspergillus to 1 gallon of extract and then fermenting the mixture until fermentation ceases.

6. The method set forth of making Japanese soy comprising first boiling soy stock material in water for about 8 to 16 hours; then extracting the liquid from the solids; then adding table salt to such extract in the proportions of about 30 to 40 pounds of salt to 10 gallons of liquid; then adding aspergillus to the salted extract in the proportions of about 1 to 3 pounds aspergillus to 1 gallon of liquid extract; then fermenting the mixture until fermentation ceases; then straining the product; and then boiling the strained product for about 45 to 60 minutes.

7. The method set forth of making Japanese soy comprising first boiling soy stock material in water for about 8 to 16 hours; then extracting the liquid from the solids; then adding salt to such liquid in the proportions of about 30 to 40 pounds of salt to 10 gallons of liquid; then adding aspergillus to such liquid in the proportions of about 1 to 3 pounds aspergillus to 1 gallon of liquid; and then fermenting the mixture until fermentation ceases; then straining the product; then boiling the resultant product for about 45 to 60 minutes; and then evaporating the liquid content of such product to produce a hardened mass which may be powdered.

8. The method set forth of making Japanese soy comprising first boiling soy stock material to obtain soy stock; extracting the liquid from such stock; then adding salt and aspergillus to the extract; then causing the mixture to ferment by heating the mixture to approximately 90° F. for 10 to 15 hours; then increasing the temperature of the mixture to approximately 120° F. for about 10 to 15 hours; then heating the mixture to approximately 140° F. for about 10 to 15 hours; and then repeating the fermentation process until fermentation ceases.

9. The method set forth of making Japanese soy comprising first boiling soy stock material to obtain a nutritive soy stock; extracting the liquids from such stock; then adding salt and aspergillus to the resulting extract; then causing the resultant mixture to ferment by heating the same to approximately 90° F. for 10 to 15 hours; then increasing the temperature of the mixture to approximately 120° F. for about 10 to 15 hours; then heating the mixture to approximately 140° F. for about 10 to 15 hours; then repeating the fermentation process until fermentation ceases; then straining the product; and then boiling the strained product.

10. The method set forth of making Japanese soy comprising first boiling soy stock material to obtain a liquid soy stock; extracting the liquid from such stock; then mixing salt and aspergillus to the resulting extract; then causing the resulting mixture to ferment by heating the mixture to approximately 90° F. for 10 to 15 hours; then increasing the temperature of the mixture to approximately 120° F. for about 10 to 15 hours; then heating the mixture to approximately 140° F. for about 10 to 15 hours; and then repeating the fermentation process until fermentation ceases; then straining the product; then boiling the product; and then evaporating the resulting product to produce a solid hardened mass.

11. The method set forth of making Japanese soy comprising obtaining from soy stock a nutritive liquid extract containing the greater portion of the starch and albumen content of such stock; removing the solids from such extract; and fermenting such extract.

In witness whereof, I have hereunto set my hand at Los Angeles, California, this 23rd day of November, 1923.

CHOKICHI MATSUOKA.

Witness:
    JAMES R. TOWNSEND.